(12) United States Patent
Burdeshaw et al.

(10) Patent No.: US 10,578,202 B2
(45) Date of Patent: Mar. 3, 2020

(54) SPROCKET FOR A SYNCHRONOUS DRIVE BELT SYSTEM

(71) Applicant: ABB Schweiz AG, Baden (CH)

(72) Inventors: Galen E. Burdeshaw, Simpsonville, SC (US); Michael E. Konruff, Simpsonville, SC (US)

(73) Assignee: ABB Schweiz AG, Baden (CH)

( * ) Notice: Subject to any disclaimer, the term of this patent is extended or adjusted under 35 U.S.C. 154(b) by 87 days.

(21) Appl. No.: 15/621,534

(22) Filed: Jun. 13, 2017

(65) Prior Publication Data

US 2018/0355965 A1    Dec. 13, 2018

(51) Int. Cl.
*F16H 55/30*    (2006.01)
*F16H 55/08*    (2006.01)
*F16H 7/02*    (2006.01)

(52) U.S. Cl.
CPC ............ *F16H 55/30* (2013.01); *F16H 55/08* (2013.01); *F16H 7/023* (2013.01); *F16H 2055/086* (2013.01)

(58) Field of Classification Search
CPC .......... F16G 1/28; F16H 55/171; F16H 7/023; B62M 9/02; B62M 2009/007
USPC ................................................. 474/153, 152
See application file for complete search history.

(56) References Cited

U.S. PATENT DOCUMENTS

| | | | | |
|---|---|---|---|---|
| 2,923,166 A * | 2/1960 | Brindley | ............... | F16H 55/171 29/892.11 |
| 3,338,107 A * | 8/1967 | Kiekhaefer | ............... | F16G 1/28 474/153 |
| 4,332,576 A * | 6/1982 | Stecklein | .................. | F16G 5/20 156/138 |
| 4,545,778 A * | 10/1985 | Koivula | .................... | F16G 1/28 474/153 |
| 4,571,224 A * | 2/1986 | Arinaga | .................. | F16H 7/023 474/153 |

(Continued)

FOREIGN PATENT DOCUMENTS

EP            309653 A2    4/1989

OTHER PUBLICATIONS

"APRM: Association for Rubber Products Manufacturers Engineering Standards: Specifications for Drive Using Curvilinear Toothed Synchronous Belts", 1997, 40 pages.

(Continued)

*Primary Examiner* — Henry Y Liu
(74) *Attorney, Agent, or Firm* — Leydig, Voit & Mayer, Ltd.

(57) ABSTRACT

A synchronous drive sprocket includes a generally annular body and a central axis extending through the generally annular body. The central axis defines circumferential, axial, and radial directions. The generally annular body has a peripheral edge and a plurality of recesses extending radially inward from the peripheral edge. The plurality of recesses define a plurality of circumferentially spaced teeth configured to receive mating teeth of a synchronous drive belt. Each tooth has an upper bearing surface and a notch extending radially inward from the peripheral edge of the tooth. Each notch is axially positioned such that the plurality of notches align with each other to collectively define a groove within the plurality of teeth. The groove extends circumferentially around at least a majority of the generally annular body and having a substantially continuous profile.

5 Claims, 6 Drawing Sheets

(56) References Cited

U.S. PATENT DOCUMENTS

| | | | | |
|---|---|---|---|---|
| 4,605,389 | A * | 8/1986 | Westhoff | F16G 1/28 474/153 |
| 5,006,096 | A * | 4/1991 | Breher | F16G 1/28 474/153 |
| 5,013,286 | A * | 5/1991 | Breher | F16G 1/28 474/153 |
| 5,417,617 | A * | 5/1995 | Milton | F16H 55/171 474/205 |
| 5,421,789 | A * | 6/1995 | Gregg | F16G 1/28 474/153 |
| 7,901,311 | B2 * | 3/2011 | Di Giacomo | F16G 1/28 474/148 |
| 8,136,827 | B2 * | 3/2012 | Lumpkin | F16H 55/171 198/834 |
| D669,343 | S * | 10/2012 | Pesch | D8/360 |
| 8,480,109 | B1 * | 7/2013 | Adams | B62M 9/02 280/261 |
| 8,562,468 | B2 * | 10/2013 | Tomobuchi | F16H 55/171 474/153 |
| 8,579,774 | B2 * | 11/2013 | Derscheid | A01F 15/18 198/835 |
| 8,888,631 | B2 * | 11/2014 | Morita | F16H 55/30 474/153 |
| 8,979,689 | B2 * | 3/2015 | Dierl | F16H 55/171 474/153 |
| 9,222,568 | B2 * | 12/2015 | Schroedl | B62M 9/02 |
| D757,524 | S * | 5/2016 | Eide | D8/360 |
| 9,469,374 | B2 * | 10/2016 | Ziliak | F16G 1/08 |
| 10,088,020 | B2 * | 10/2018 | Cody | F16H 7/18 |
| 2003/0195072 | A1 * | 10/2003 | Redmond | F16H 55/30 474/161 |
| 2005/0096169 | A1 * | 5/2005 | Reichard, II | F16H 55/36 474/152 |
| 2007/0105674 | A1 * | 5/2007 | Hogn | F16G 1/28 474/152 |
| 2007/0182219 | A1 * | 8/2007 | Mori | B60J 7/0573 296/223 |
| 2009/0093328 | A1 * | 4/2009 | Dickinger | F16H 55/171 474/152 |
| 2010/0105509 | A1 * | 4/2010 | Tomobuchi | F16H 7/023 474/153 |

OTHER PUBLICATIONS

"MPTA Synchronous Drive Identification Informational Bulletin", No. MPTA-B3c-2016, 4 pages, published prior to Jun. 2017.

* cited by examiner

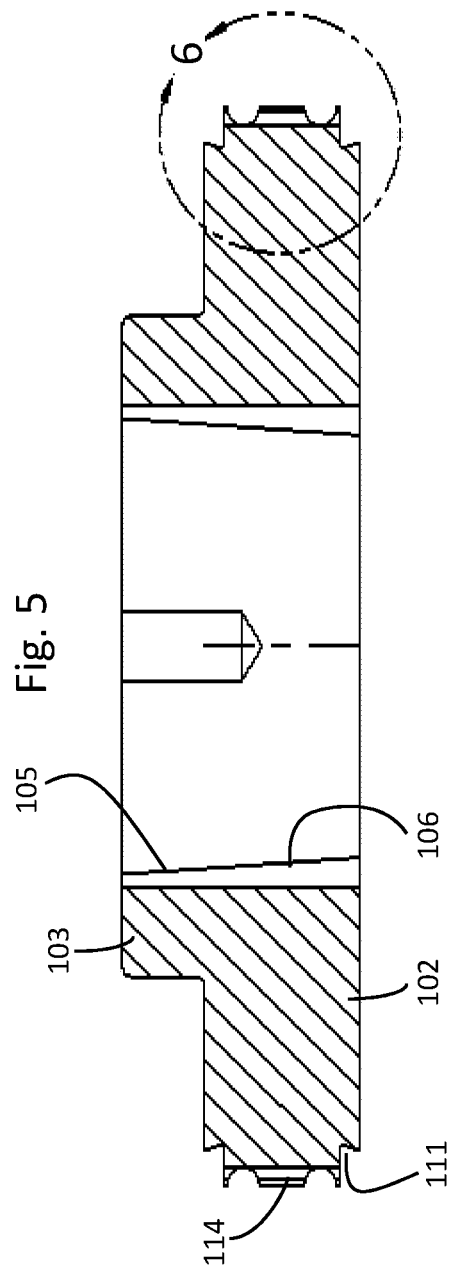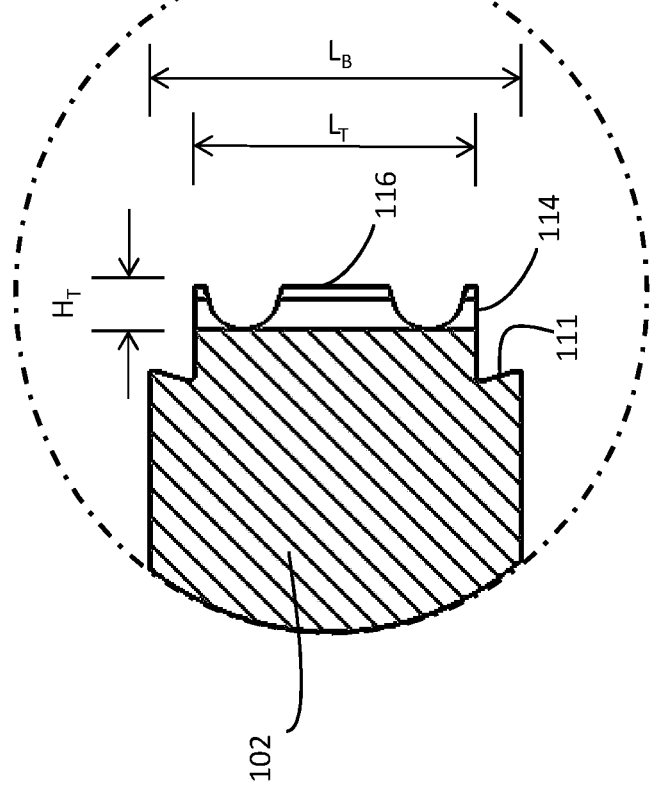

SPROCKET FOR A SYNCHRONOUS DRIVE BELT SYSTEM

FIELD OF THE INVENTION

The present invention relates generally to a sprocket, and more specifically to a synchronous drive sprocket for a synchronous drive belt system.

BACKGROUND

Synchronous drive belt systems typically include a synchronous drive belt and at least two sprockets, with each sprocket being attached to a shaft such that each sprocket is rotatable about a central axis. Generally, the synchronous drive belt includes a plurality of teeth offset by a pitch and each sprocket includes a plurality of teeth offset by the same pitch, thereby enabling the teeth of the synchronous drive belt to mesh with the teeth of the sprockets. For most synchronous drive belt systems, the teeth of the belt and sprockets are oriented parallel to the shaft.

Synchronous drive belt systems provide a number of advantages compared to other drive belt systems, such as V-belt drive systems. For example, a typical synchronous drive belt system may have an energy efficiency of around 98% while a typical V-belt drive system may have an energy efficiency in the range of around 90%-95%. However, one significant disadvantage of current synchronous drive belt systems is that they often have a noise level greater than other drive belt systems, including V-belt drive systems. One way previous synchronous drive belt systems have tried to reduce the noise level is by altering the tooth profile of the synchronous drive belt. In some instances, the benefits associated with the varying tooth profiles have been negligible. Another way previous synchronous drive belt systems have tried to reduce the noise level is by altering the teeth design of the belt and sprockets such that the plurality of teeth are not oriented parallel to the shaft. Such systems can have installation difficulties because it can be difficult to align the teeth of synchronous drive belt with the teeth sprockets. Additionally, such systems require the use of specialized belts and sprockets.

Accordingly, it may be desirable to manufacture a sprocket for a synchronous drive belt system that is designed to reduce the noise level of the system and be usable with a standard parallel-toothed synchronous drive belt.

SUMMARY

One aspect of the present disclosure provides a synchronous drive sprocket including a generally annular body and a central axis extending through the generally annular body. The central axis defines circumferential, axial, and radial directions. The generally annular body has a peripheral edge and a plurality of recesses extending radially inward from the peripheral edge. The plurality of recesses define a plurality of circumferentially spaced teeth configured to receive mating teeth of a synchronous drive belt. Each tooth has an upper bearing surface configured to bear against a synchronous drive belt and a notch extending radially inward from the peripheral edge of the tooth. Each notch is axially positioned such that the plurality of notches align with each other to collectively define a groove within the plurality of teeth. The groove extends circumferentially around at least a majority of the generally annular body and has a substantially continuous profile.

Another aspect of the present disclosure provides a synchronous drive sprocket including a generally annular body and a central axis extending through the generally annular body. The synchronous drive sprocket is rotatable about the central axis. The central axis defines circumferential, axial, and radial directions. The generally annular body has a peripheral edge and a plurality of recesses extending radially inward from the peripheral edge. The plurality of recesses defines a plurality of circumferentially spaced teeth. Each tooth has an upper bearing surface configured to bear against a synchronous drive belt and a notch extending radially inward from the peripheral edge of the tooth. The notch of one tooth is axially positioned relative to the notch of a circumferentially adjacent tooth in a manner such that notches of the teeth collectively define a circumferential groove within the plurality of teeth. The circumferential groove has a substantially continuous profile.

Another aspect of the present disclosure provides a sprocket including a generally annular body and a central axis extending through the generally annular body. The generally annular body has an exterior circumferential surface. The central axis defines circumferential, axial, and radial directions. The exterior circumferential surface is at least partially formed by a plurality of axially extending teeth. Each tooth is circumferentially spaced from an adjacent tooth. Each tooth has an upper bearing surface configured to bear against a synchronous drive belt and a notch. The plurality of notches cooperate to form a groove in the plurality of axially extending teeth.

BRIEF DESCRIPTION OF THE DRAWINGS

FIG. 5 is a cross-sectional view of the sprocket taken along line 5-5 of FIG. 2.

FIG. 6 is an enlarged view of detail area 6 of FIG. 5.

DETAILED DESCRIPTION

In the following description, various embodiments in accordance with the present disclosure will be described in further detail. For purposes of explanation, specific configurations and details are set forth in order to provide a thorough understanding of the provided embodiment. However, it will also be apparent to one skilled in the art that the embodiments may be practiced without the specific details. Furthermore, well-known features may be omitted or simplified in order not to obscure the embodiment being described.

Figure 1:
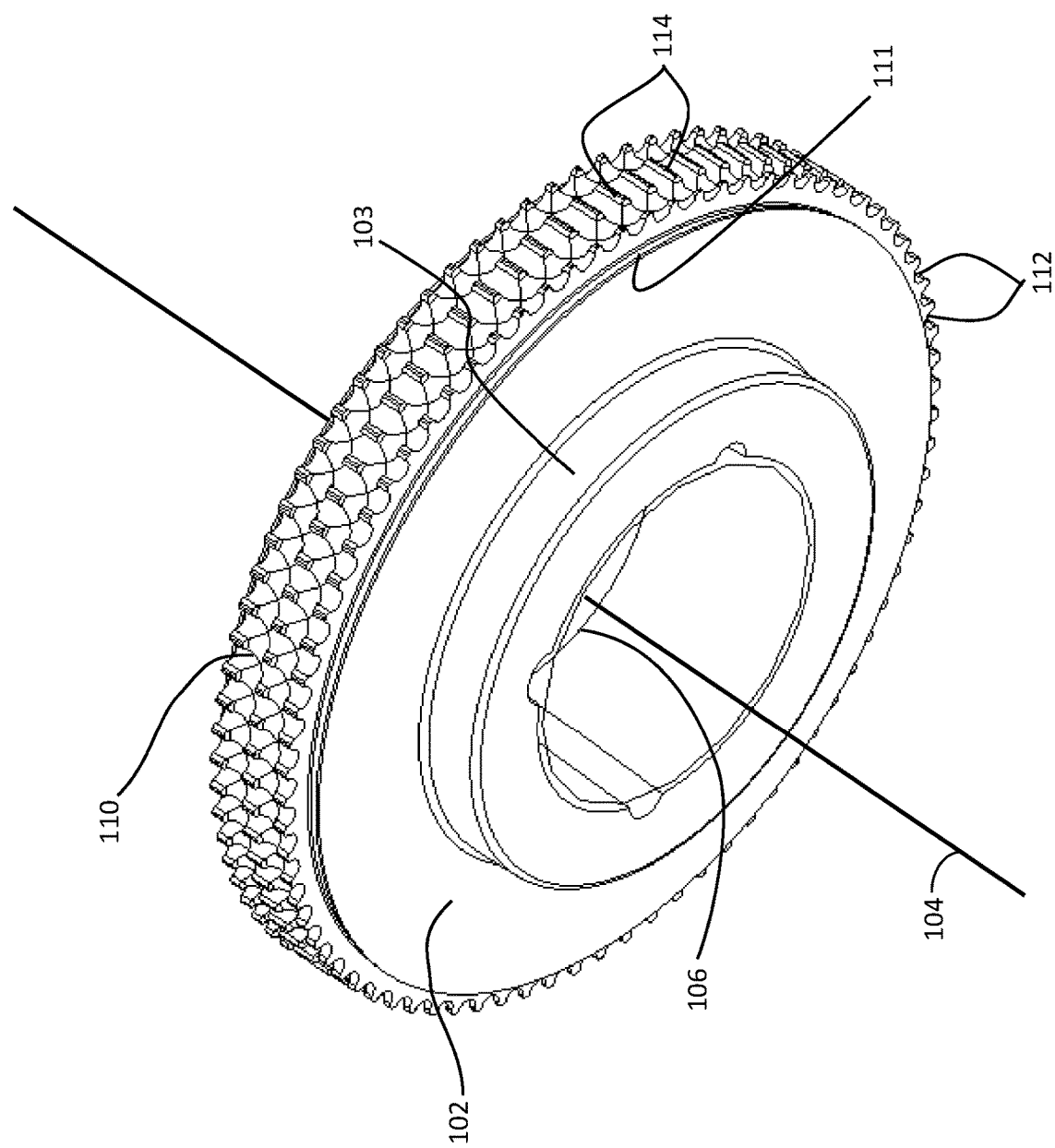
FIG. 1 is a perspective view of an exemplary sprocket in accordance with the present disclosure.
Figure 2:
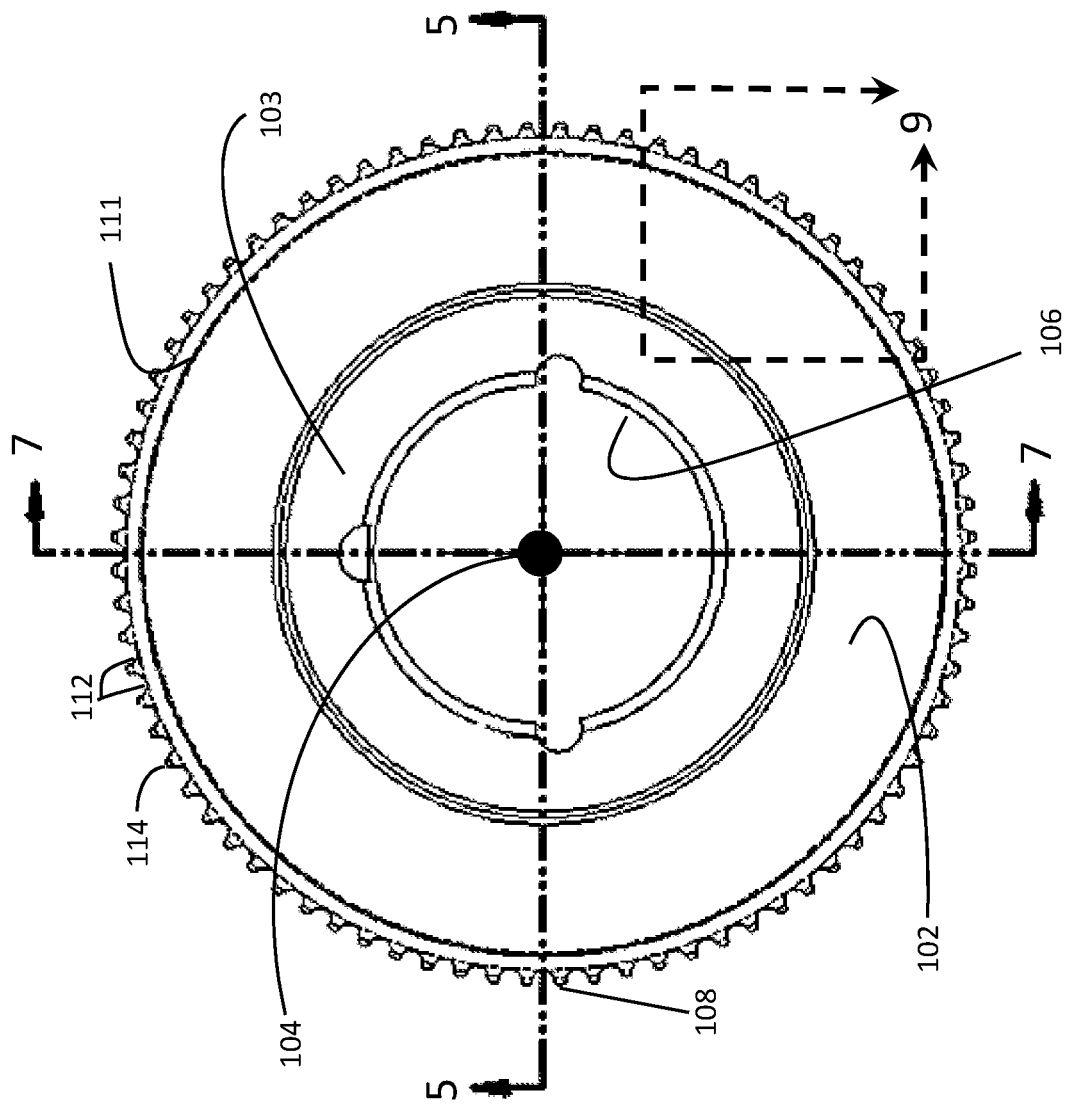
FIG. 2 is a front elevation view of the sprocket of FIG. 1.

The disclosure described and suggested herein relates to a sprocket for a synchronous drive belt system. An embodiment of the sprocket is shown generally in FIGS. 1-8 and identified by numeral 100. The sprocket 100 is a synchronous drive sprocket including a generally annular body 102, a center hub 103, and a central axis 104. As best seen in FIG. 1, the central axis 104 of the sprocket 100 extends through the generally annular body 102 and defines circumferential, axial, and radial directions. More specifically, the central axis 104 extends through the central aperture 106 of the generally annular body 102.

The generally annular body central aperture 106 extends through the center hub 103 configured to receive a shaft (not shown). Thus, the central aperture 106 enables the sprocket 100 to be mounted to a shaft of a synchronous drive belt system. In one embodiment, the sprocket 100 may be mounted to the shaft directly via the central aperture 106. Alternatively, the sprocket 100 may be mounted to the shaft via the central aperture 106 and an additional component, such as, for example, a tapered bushing or tapered locking sleeve system (not shown). The central aperture may be tapered to receive the tapered bushing or tapered locking sleeve system. When the sprocket 100 is attached to a shaft of a synchronous drive belt system, the sprocket is rotatable in the circumferential direction about the central axis 104. The center hub 103 may protrude axially outward from the generally annular body 102 relative to the central axis 104. As seen in FIG. 5, the center hub 103 is integral with the generally annular body 102. In some embodiments, the center hub may be recessed in the annular body.

Figure 9:
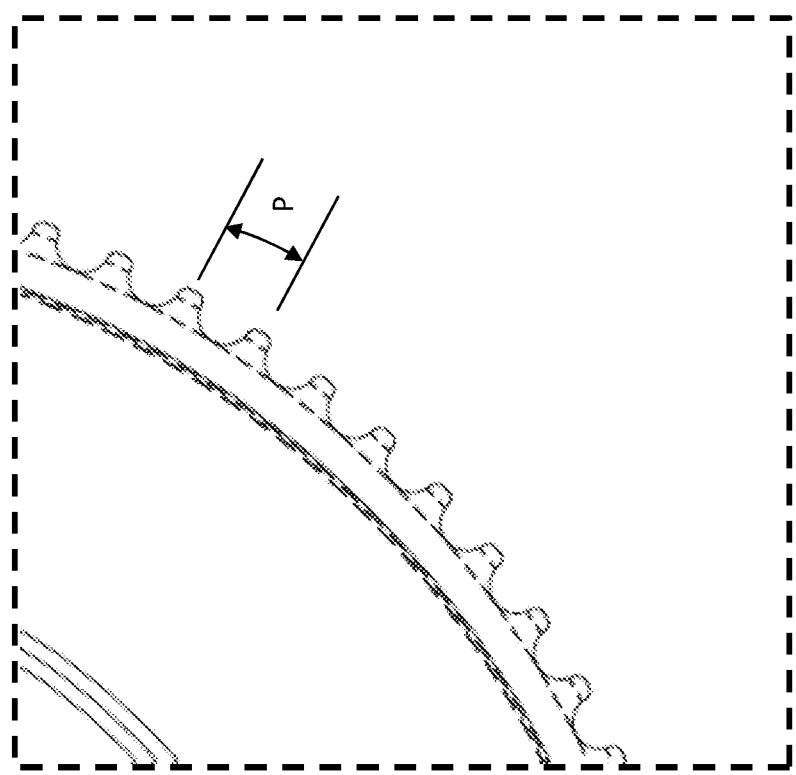
FIG. 9 is an enlarged view of detail area 9 in FIG. 3.

The generally annular body 102 of the sprocket 100 has a peripheral edge 108 (seen in FIGS. 2-4) and an exterior circumferential surface 110. Recesses 111 may be provided on the axial side faces of the annular body 102 toward the peripheral edge 108. The recesses 111 may be configured to receive side flanges (not shown) that extend radially outward beyond the peripheral edge 108 and exterior circumferential surface 110 and help center the belt on the sprocket. The generally annular body 102 further has a plurality of recesses 112 extending radially inward from the peripheral edge 108. The plurality of recesses 112 define a plurality of circumferentially spaced teeth 114. The plurality of teeth 114 extend axially relative to the central axis 104 such that each tooth is substantially parallel to each other and to the central axis. The plurality of teeth 114 form the outer circumferential surface 110 of the generally annular body 102. As seen in FIG. 9, the plurality of recesses 112 are substantially identical to each other. Because the plurality of recesses 112 are substantially identical to each other, the axially extending teeth 114 are uniformly spaced apart by a pitch P (FIG. 9), with the pitch P being measured circumferentially relative to the central axis 104.

Figure 8:
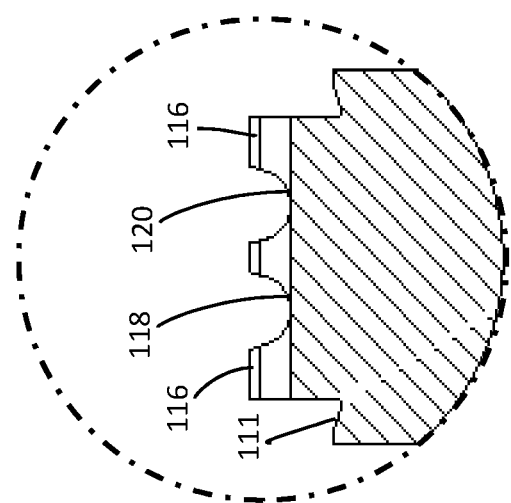
FIG. 8 is an enlarged view of detail area 8 of FIG. 7.

As seen in FIGS. 6 and 8, each tooth 114 has a height $H_T$ and a length $L_T$. The height $H_T$ extends radially relative to the central axis 104 from the peripheral edge 108 and the length $L_T$ extends axially relative to the central axis. In the present embodiment, the height $H_T$ is less than the length $L_T$. Additionally, the length $L_T$ of each tooth is shown less than a length $L_B$ of the generally annular body. The length $L_B$ of the generally annular body extends axially relative to the central axis 104. In some embodiments, the length $L_b$ may be wider than the center hub 103. Each tooth 114 is substantially similar in shape and has an upper bearing surface 116. The plurality of teeth 114 are configured to receive mating teeth of a synchronous drive belt (not shown) in a manner such that the upper bearing surface 116 of each tooth can contact the synchronous drive belt during operation of a synchronous drive belt system. Additionally, each tooth 114 has at least one notch extending radially inward from the peripheral edge of the tooth and having a notch depth $D_N$. In the embodiment shown in the figures, each tooth 114 has a first notch 118 and a second notch 120, wherein the notch depth $D_N$ of the first and second notches is substantially similar to the tooth height $H_T$. In another embodiment of the sprocket 100, each tooth could have only one notch. Alternatively, each tooth could have more than two notches. The notch depth may differ among the plurality of teeth.

The first notch 118 is axially spaced from the second notch 120. Each first notch 118 is axially positioned relative to the first notch of a circumferentially adjacent tooth such that the first notches collectively define a first circumferential groove 122 within the plurality of teeth. Accordingly, each first notch 118 is axially positioned such that the plurality of first notches align with each other to collectively define the first groove 122 within the plurality of teeth 114. Similarly, each second notch 120 is axially positioned relative to the second notch of a circumferentially adjacent tooth such that the second notches collectively define a second circumferential groove 124 within the plurality of teeth 114. Accordingly, each second notch is axially positioned such that the plurality of second notches align with each other to collectively define the second groove 124 within the plurality of teeth.

Figure 3:
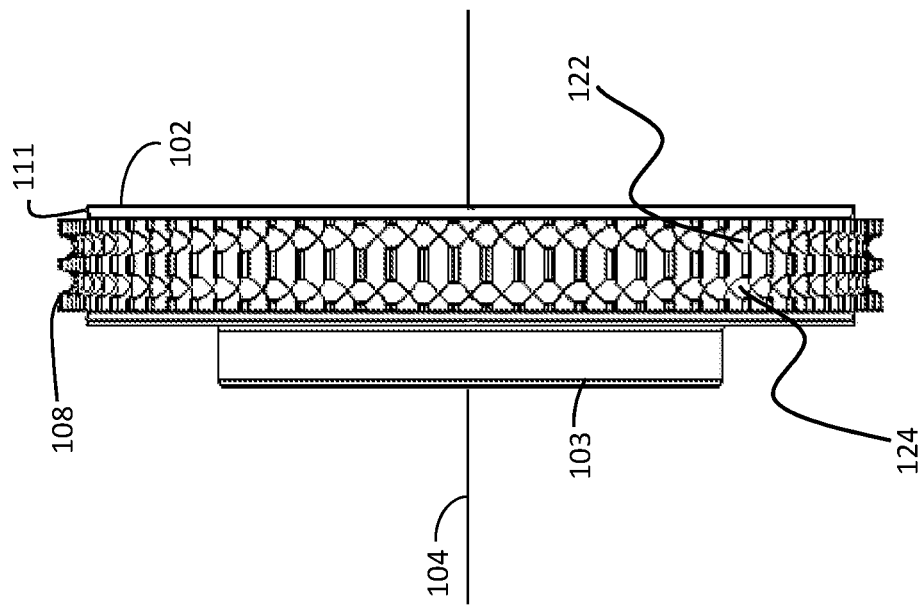
FIG. 3 is a right side view of the sprocket of FIG. 2, the left side view being a mirror image thereof.
Figure 4:
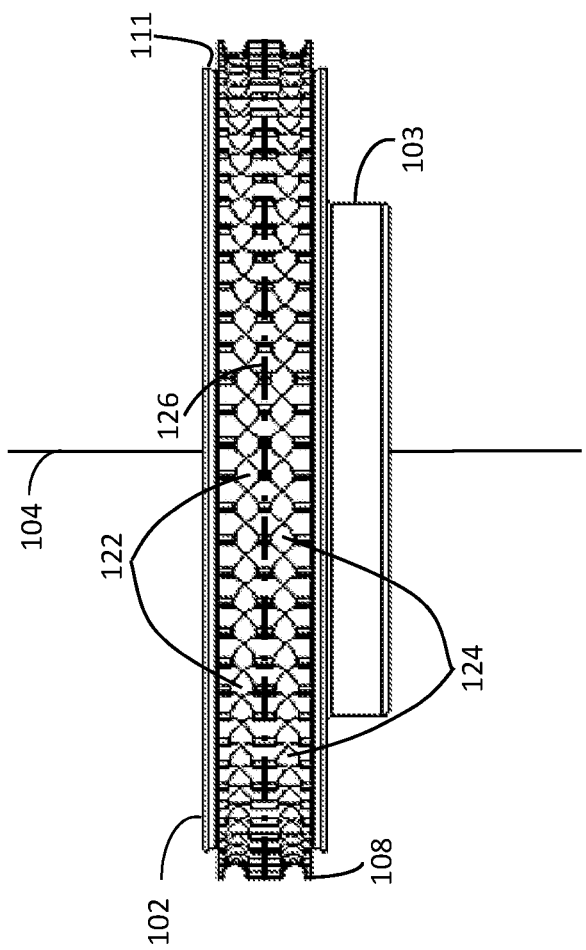
FIG. 4 is a top view of the sprocket of FIG. 2, the bottom view being a mirror image thereof.
Figure 7:
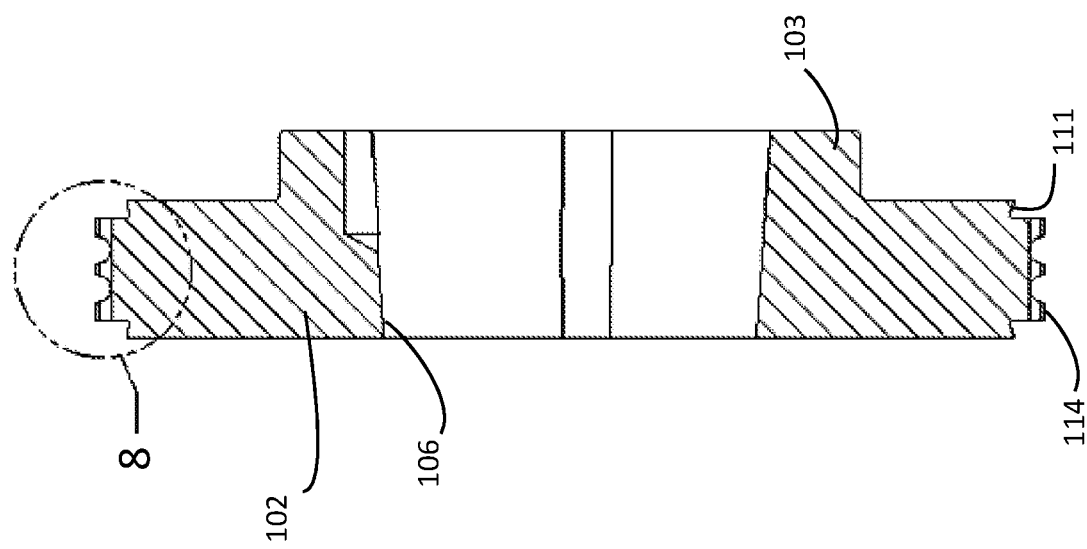
FIG. 7 is a cross-sectional view taken along line 7-7 of FIG. 2.

As seen in FIGS. 1, 3, and 4, the first and second grooves 122, 124 extend circumferentially around the generally annular body and have a substantially continuous profile. The substantially continuous profile of the first groove 122 is symmetrical to the substantially continuous profile of the second groove 124 about a circumferential axis 126 of the sprocket. In this particular embodiment, the substantially continuous profile of the first groove 122 is a first waveform, and the substantially continuous profile of the second groove 124 is a second waveform. The first waveform is a mirror image of the second waveform, with the first waveform being a sine wave. In another embodiment of the sprocket 100, the first and second grooves 122, 124, respectively, may have differing substantially continuous profile. For example, the first groove 122 could have a waveform that is a square wave while the second groove 124 could have a waveform that is a triangle wave.

The first and second grooves 122, 124 function to reduce the noise level associated with the operation of a synchronous drive belt system. During the operation of a synchronous drive belt system, acoustic noise is generated as a result of air that becomes partially entrapped as the teeth of the synchronous drive belt mesh with the teeth of the sprocket. The first and second grooves 122, 124 provide an additional pathway for air to escape as the teeth of the synchronous drive belt mesh with the teeth of the sprocket, thereby reducing the noise level associated with the synchronous drive belt system.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, various modifications and changes may be made thereunto without departing from the broader spirit and scope of the invention as set forth in the claims and that the invention is intended to cover all modifications and equivalents within the scope of the following claims.

What is claimed is:

1. A synchronous drive sprocket comprising:

a generally annular body and a central axis extending through the generally annular body, the central axis defining circumferential, axial, and radial directions, the generally annular body having a peripheral edge and a plurality of recesses extending radially inward from the peripheral edge, the plurality of recesses defining a plurality of circumferentially spaced teeth configured to receive mating teeth of a synchronous drive belt, each tooth having an upper bearing surface configured to bear against a synchronous drive belt and a notch extending radially inward from the peripheral edge of the tooth, each notch being axially positioned such that the plurality of notches align with each other to collectively define a groove within the plurality of teeth, the groove extending circumferentially around at least a majority of the generally annular body and having a substantially continuous profile, wherein the notch is a first notch and the groove is a first groove, each tooth further comprising a second notch axially spaced from the first notch, the second notch extending radially inward from the peripheral edge of the tooth, each second notch being axially positioned such that the plurality of second notches align with each other to collectively define a second groove within the plurality of teeth, the second groove extending circumferentially around at least a majority of the generally annular body and having a substantially continuous profile, and wherein the substantially continuous profile of the first groove is a first waveform and the substantially continuous profile of the second groove is a second waveform, different than the first waveform.

2. The synchronous drive sprocket as set forth in claim 1 wherein the generally annular body further comprises a central aperture coaxially aligned with central aperture and configured to receive a shaft.

3. The synchronous drive sprocket as set forth in claim 1 wherein each tooth has an axial tooth width and the generally annular body has an axial body width, the axial tooth width being less than the axial body width.

4. The synchronous drive sprocket of claim 1 wherein each notch has a notch depth and each recess has a recess depth, the recess depth of each recess being substantially equal to the notch depth of each notch.

5. A synchronous drive sprocket comprising:

a generally annular body and a central axis extending through the generally annular body, the generally annular body having an exterior circumferential surface, the central axis defining circumferential, axial, and radial directions, the exterior circumferential surface being at least partially formed by a plurality of axially extending teeth, each tooth being circumferentially spaced from an adjacent tooth, each tooth having an upper bearing surface configured to bear against a synchronous drive belt and a notch, the plurality of notches cooperating to form a groove in the plurality of axially extending teeth, wherein the notch is a first notch and the groove is a first groove, each tooth further comprising a second notch axially spaced from the first notch, the plurality of second notches cooperating to form a second groove in the outer circumferential space of the generally annular body, the second groove having a substantially continuous profile, and wherein the substantially continuous profile of the first groove is a first waveform and the substantially continuous profile of the second groove is a second waveform, the first waveform being different from the second waveform.

* * * * *